United States Patent
Baset et al.

(10) Patent No.: US 10,296,320 B2
(45) Date of Patent: May 21, 2019

(54) PATCHING SYSTEMS AND APPLICATIONS IN A VIRTUALIZED ENVIRONMENT

(71) Applicant: International Business Machines Corporation, Armonk, NY (US)

(72) Inventors: Salman A. Baset, New York, NY (US); Hai Huang, White Plains, NY (US); Manas Singh, Chappaqua, NY (US); Byung Chul Tak, Elmsford, NY (US); Chunqiang Tang, Ossining, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 14/482,010

(22) Filed: Sep. 10, 2014

(65) Prior Publication Data

US 2016/0070556 A1 Mar. 10, 2016

(51) Int. Cl.
G06F 8/65 (2018.01)
G06F 9/455 (2018.01)
H04W 4/60 (2018.01)
H04W 4/00 (2018.01)
H04L 29/08 (2006.01)

(52) U.S. Cl.
CPC ............ G06F 8/65 (2013.01); G06F 9/45558 (2013.01); H04L 67/10 (2013.01); H04W 4/003 (2013.01); H04W 4/60 (2018.02); G06F 2009/4557 (2013.01)

(58) Field of Classification Search
CPC .................. G06F 8/65; G06F 9/45558; G06F 2009/4557; H04W 4/60; H04W 4/003; H04L 67/10

USPC ......................................................... 717/168
See application file for complete search history.

(56) References Cited

U.S. PATENT DOCUMENTS

| | | | |
|---|---|---|---|
| 7,072,951 B2 | 7/2006 | Klopp et al. | |
| 8,799,422 B1* | 8/2014 | Qu | H04L 45/64 709/220 |
| 9,225,529 B1* | 12/2015 | Natanzon | H04L 67/10 |
| 2002/0065911 A1 | 5/2002 | Klopp et al. | |
| 2006/0101097 A1* | 5/2006 | Barboi | G06F 11/1471 |
| 2010/0106885 A1* | 4/2010 | Gao | G06F 8/65 711/6 |
| 2011/0292792 A1* | 12/2011 | Zuo | H04L 47/20 370/230 |
| 2012/0017114 A1* | 1/2012 | Timashev | G06F 11/1469 714/15 |
| 2012/0117563 A1* | 5/2012 | Chang | G06F 9/45558 718/1 |
| 2012/0324183 A1* | 12/2012 | Chiruvolu | G06F 11/2038 711/162 |
| 2013/0024722 A1* | 1/2013 | Kotagiri | G06F 11/1004 714/6.1 |

(Continued)

*Primary Examiner* — Li B. Zhen
*Assistant Examiner* — Sen Thong Chen
(74) *Attorney, Agent, or Firm* — Joann Crockatt

(57) ABSTRACT

A method for updating an application executing on a virtual machine includes replicating the virtual machine to produce a replica, applying an update to the replica that is scheduled to be made to the virtual machine, in parallel with the applying, updating one of the virtual machine and the replica so that a state of the virtual machine matches a state of the replica, and continuing execution of the application on one of the virtual machine and the replica.

8 Claims, 5 Drawing Sheets

(56) References Cited

U.S. PATENT DOCUMENTS

| | | | | |
|---|---|---|---|---|
| 2013/0086202 A1* | 4/2013 | Connelly | ................ | H04L 67/10 |
| | | | | 709/217 |
| 2013/0198739 A1* | 8/2013 | Razdan | ............... | G06F 9/45558 |
| | | | | 718/1 |
| 2014/0223431 A1* | 8/2014 | Yoshimura | .......... | G06F 9/45558 |
| | | | | 718/1 |
| 2015/0227567 A1* | 8/2015 | Zamir | ..................... | H04L 67/10 |
| | | | | 709/223 |
| 2015/0293820 A1* | 10/2015 | Doshi | ................ | G06F 11/2097 |
| | | | | 711/162 |

* cited by examiner

US 10,296,320 B2

PATCHING SYSTEMS AND APPLICATIONS IN A VIRTUALIZED ENVIRONMENT

BACKGROUND OF THE INVENTION

The present invention relates generally to computer software and relates more specifically to patching computer systems and applications executing in virtualized environments.

A patch is a piece of software designed to fix problems with, or update, a computer program or its supporting data. Computer systems and applications need to be frequently patched and upgraded to fix security vulnerabilities and other bugs, and improve the usability or performance. However, patching and post-patch testing is time consuming, and may even lead to unpredictable failures, which results in significant service downtime.

Downtime is a significant drawback for services that demand high availability. For instance, to achieve an availability of higher than 99.9%, a service can be down for no more than approximately two hours every three months. To achieve an availability of 99.99%, that window of permissible downtime shrinks to no more than thirteen minutes every three months.

SUMMARY OF THE INVENTION

A method for updating an application executing on a virtual machine includes replicating the virtual machine to produce a replica, applying an update to the replica that is scheduled to be made to the virtual machine, in parallel with the applying, updating one of the virtual machine and the replica so that a state of the virtual machine matches a state of the replica, and continuing execution of the application on one of the virtual machine and the replica.

A computer program product for updating an application executing on a virtual machine includes a computer readable storage medium having program instructions embodied therewith, where the program instructions are executable by a processor to cause the processor to perform a method including replicating the virtual machine to produce a replica, applying an update to the replica that is scheduled to be made to the virtual machine, in parallel with the applying, updating one of the virtual machine and the replica so that a state of the virtual machine matches a state of the replica, and continuing execution of the application on one of the virtual machine and the replica

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for patching systems and applications in a virtualized environment. Embodiments of the invention minimize the downtime required to patch or update systems and applications by taking advantage of virtualization capabilities, which allow for replicating a virtual machine (i.e., a software-based emulation of a computer) without service downtime. Particular embodiments employ techniques based on the live replication of virtual machines, including techniques that replay service requests, replay patch procedures, and/or merge state deltas.

Figure 1:
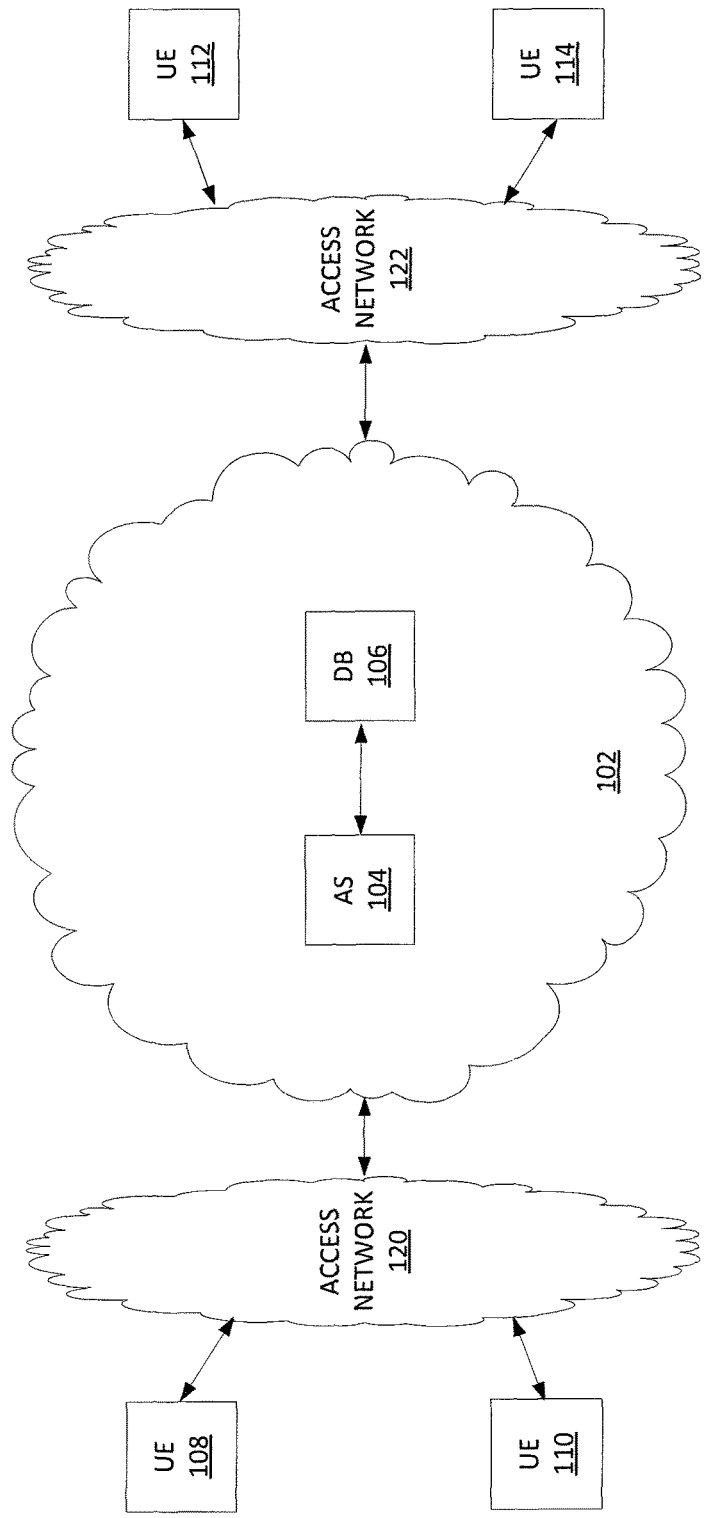
FIG. 1 is a block diagram depicting one example of a network within which embodiments of the present invention may be deployed.

FIG. 1 is a block diagram depicting one example of a network 100 within which embodiments of the present invention may be deployed. The network 100 may be any type of communications network, such as for example, an Internet Protocol (IP) network (e.g., an IP Multimedia Subsystem (IMS) network, an asynchronous transfer mode (ATM) network, a wireless network, a cellular network, a long term evolution (LTE) network, and the like). An "IP network" is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed. For instance, the core network 102 may comprise a portion of a cloud environment in which services and applications are supported in a highly distributed manner.

Figure 5:
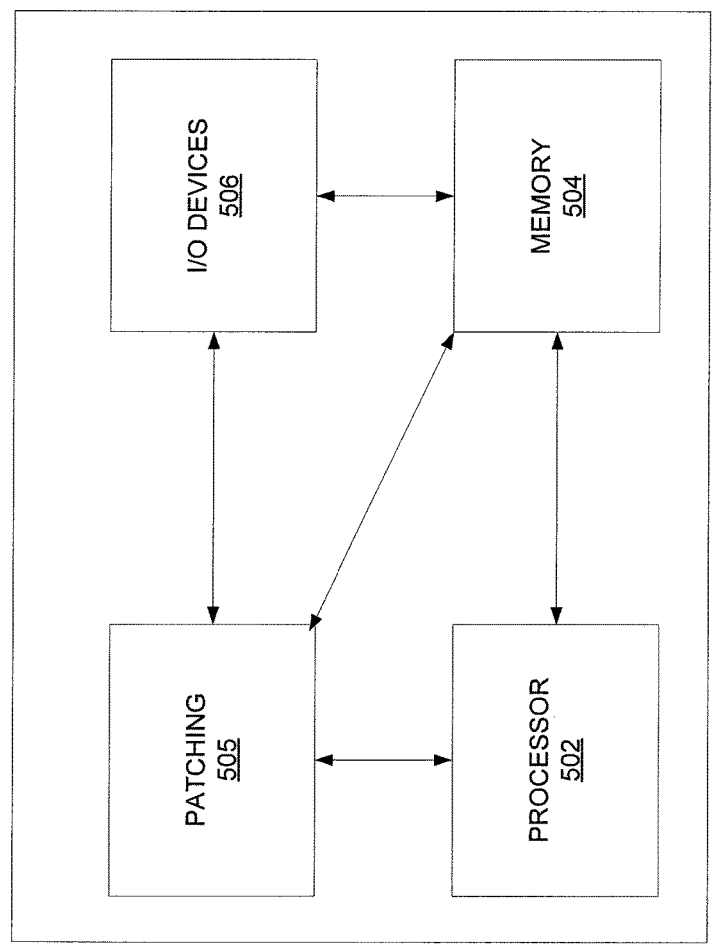
FIG. 5 is a high-level block diagram of the patching method that is implemented using a general purpose computing device.

In one embodiment, the AS 104 may comprise a general purpose computer as illustrated in FIG. 5 and discussed below. In one embodiment, the AS 104 may perform the methods and algorithms discussed below related to patching systems and applications. For instance, the AS 104 may initiate replication of a virtual machine and/or patching of the replica.

In one embodiment, the DB 106 stores data relating to the applications and/or systems being patched or updated. For instance, the DB 106 may store user requests issued to the applications or systems, manual inputs recorded during patching and testing procedures, or other data. Although only one DB 106 is illustrated, the network 100 may include multiple databases.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device that is capable of accessing services from a cloud-based service provider, such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. It should be noted that although only four user endpoint devices are illustrated in FIG. 1, any number of user endpoint devices may be deployed.

It should be noted that the network 100 has been simplified. For example, the network 100 may include other network elements (not shown) such as border elements, routers, switches, policy servers, security devices, a content distribution network (CDN) and the like.

As discussed above, embodiments of the invention replicate virtual machines that execute applications in order to minimize service downtime while the applications are patched or updated. The precise steps through which the replication and patching occur may vary somewhat depending on whether a single virtual machine or multiple virtual machines are involved.

Figure 2:
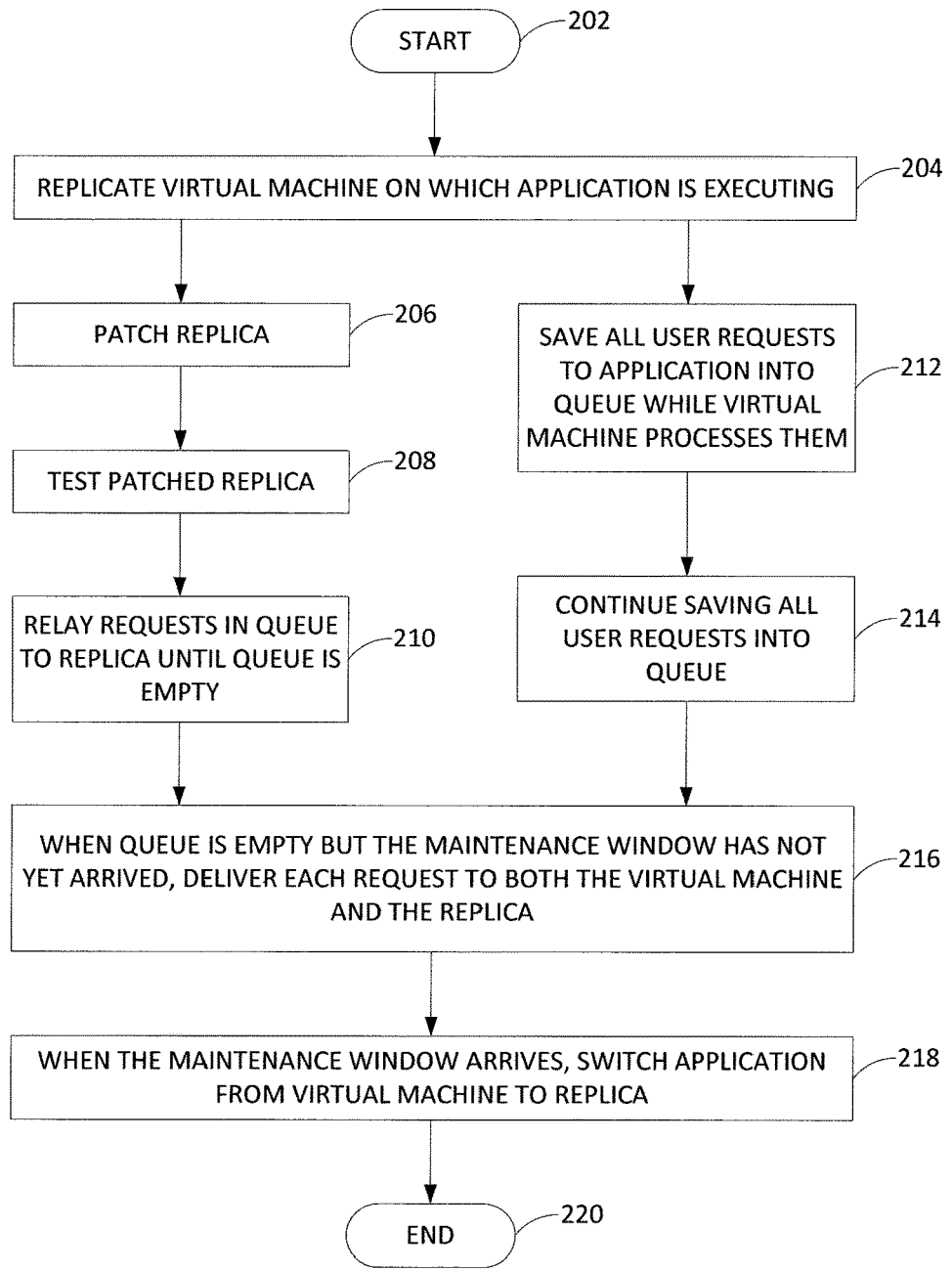
FIG. 2 is a flow diagram illustrating one embodiment of a method for patching an application executing in a virtualized environment, according to embodiments of the present invention.

FIG. 2, for example, is a flow diagram illustrating one embodiment of a method 200 for patching an application executing in a virtualized environment, according to embodiments of the present invention. In particular, the method 200 patches an application using an approach that replays service requests. Although the method 200 is described within the context of an application executing on a single virtual machine, the method 200 can be easily extended to multi-tier applications executing on multiple virtual machines as discussed in further detail below. In one embodiment, the method 200 is executed by the AS 104, which in this case manages the replication of the virtual machine and the patching of the replica.

The method 200 begins in step 202. In step 204, the AS 104 replicates the virtual machine on which the application is executing. This results in the creation of a replica virtual machine, or simply a "replica."

Next, two sequences of events occur in parallel (i.e., substantially simultaneously, although one sequence may complete before the other). These two sequences are depicted respectively in steps 206-210 and steps 212-214 of FIG. 2.

In step 206, the AS 104 patches the replica. Patching of the replica involves applying any updates, security fixes, or the like that are scheduled to be applied to the virtual machine to the replica. In step 208, the patched replica is tested, and any problems identified during testing are fixed (which may also require a reboot of the replica).

In step 210, the AS 104 replays all user requests issued to the virtual machine, which have been stored in a queue, to the replica. Replay is performed until the queue is empty. In one embodiment, the queue is stored in the DB 106. By replaying the requests to the replica, the replica is brought up to the same state as the virtual machine, but with the updates that the virtual machine lacks.

In step 212, the AS 104 saves all user requests issued to the virtual machine into the queue. As discussed above, the virtual machine continues to process the user requests normally during this time. In step 214, the AS 104 continues to save all user requests issued to the virtual machine to the queue.

Once steps 206-210 and steps 212 to 214 have completed, the method 200 proceeds to step 216. In step 216, when the queue is empty, but a predefined maintenance window has not yet arrived (e.g., where the predefined maintenance window specifies when a switch from the virtual machine to the replica may occur), each new user request is delivered to both the virtual machine and the replica.

In step 218, when the maintenance window arrives, the AS 104 switches (e.g., migrates) the execution of the application from the virtual machine to the replica. The virtual machine is shut down, while the replica assumes the role previously performed by the virtual machine. In an alternative embodiment, the switch may be made immediately after completion of step 210 (e.g., immediately after all requests in the queue have been replayed to the replica) rather than waiting for a predefined maintenance window.

In step 214, the method 200 ends.

The method 200 thus takes advantage of virtualization capabilities (i.e., particularly the abilities to replicate virtual machines and replay service requests) in order to facilitate patching and updating of applications and systems. Because an application can be migrated from its original virtual machine to a fully updated replica of the virtual machine, patches and updates can be implemented with minimal service downtime.

In the event that the application executes on only a single virtual machine, patching of a single corresponding replica according to the method 200 is relatively straightforward. However, in the event that the application comprises a multi-tier service executing on multiple virtual machines (and for which multiple replicas must be produced), there are several different ways in which the method 200 (particularly, steps 208-212) may be performed.

In one embodiment, the multiple replicas are patched one at a time. In particular, as the first replica is being patched, replicas for the remaining virtual machines are created. Once the switch to the first replica (from the corresponding virtual machine) is made, all of the virtual machines are shut down, and the remaining replicas work with the first replica to execute the application. This process is then repeated for the remaining replicas, one-by-one, until all replicas have been patched.

In another embodiment, all of the replicas are patched at the same time. In particular, all of the virtual machines are replicated, and only the requests that are delivered to the virtual machines interfacing to the outside are saved and replayed. Then, the switches from all of the virtual machines to the corresponding replicas are made simultaneously. In this case, a short maintenance window will make the switch possible without requiring strict synchronization.

In another embodiment, a selected subset of the replicas is patched simultaneously, and multiple such simultaneous patches of subsets are made. Thus, this approach is a hybrid of the one-at-a-time and all-at-once approaches.

In the event that an application or service executes on a multi-tier architecture, it may also be the case that different tiers (e.g., different ones of the virtual machines) are under the control of different parties. In this case, only the virtual machine or machines under the control of the AS 104 are patched using the request replay approach of the method 200. However, it will be difficult to accurately replay communications between the virtual machines under the control of the AS 104 (hereinafter referred to for exemplary purposes as VM1) and the virtual machines not under the control of the AS 104 (hereinafter referred to for exemplary purposes as VM2) in scenarios handling simultaneous requests.

In this case, patching is facilitated by creating a mapping between requests from VM1 to VM2 and corresponding responses from VM2 to VM1 and by saving and replaying VM1-to-VM2 data flows. Embodiments of the invention maintain information about which data flows correspond to which requests, and by using the mapping, can replay the VM2-to-VM1 flows for the corresponding VM1-to-VM2 flows.

One potential complication to the approach described above is that certain service protocols require random numbers to be generated as session keys. When such a random-value key is generated by a virtual machine after its replica is created, the subsequent service requests to the virtual machine may include this key. If the replica generates a different key, then the replay of the requests may fail.

To address this situation, in one embodiment, immediately after the replica is created, the system calls setting the seeds for random value generation (e.g., srand( ) and/or other similar system calls) in the virtual machine are monitored, and their seed values are recorded. Then, during replay of requests in the replica, the system calls are intercepted in the replica, and the recorded seed values are provided.

If the virtual machine handled multiple sessions, and the handling of these sessions is interleaved differently in the virtual machine and in the replica, then some further steps may be necessary. In this case, the seed values are correctly matched to the sessions, for instance by matching each system call invocation in the replica with the corresponding system call invocation in the virtual machine. This matching process can be facilitated using various techniques for flow tracing.

Figure 3:
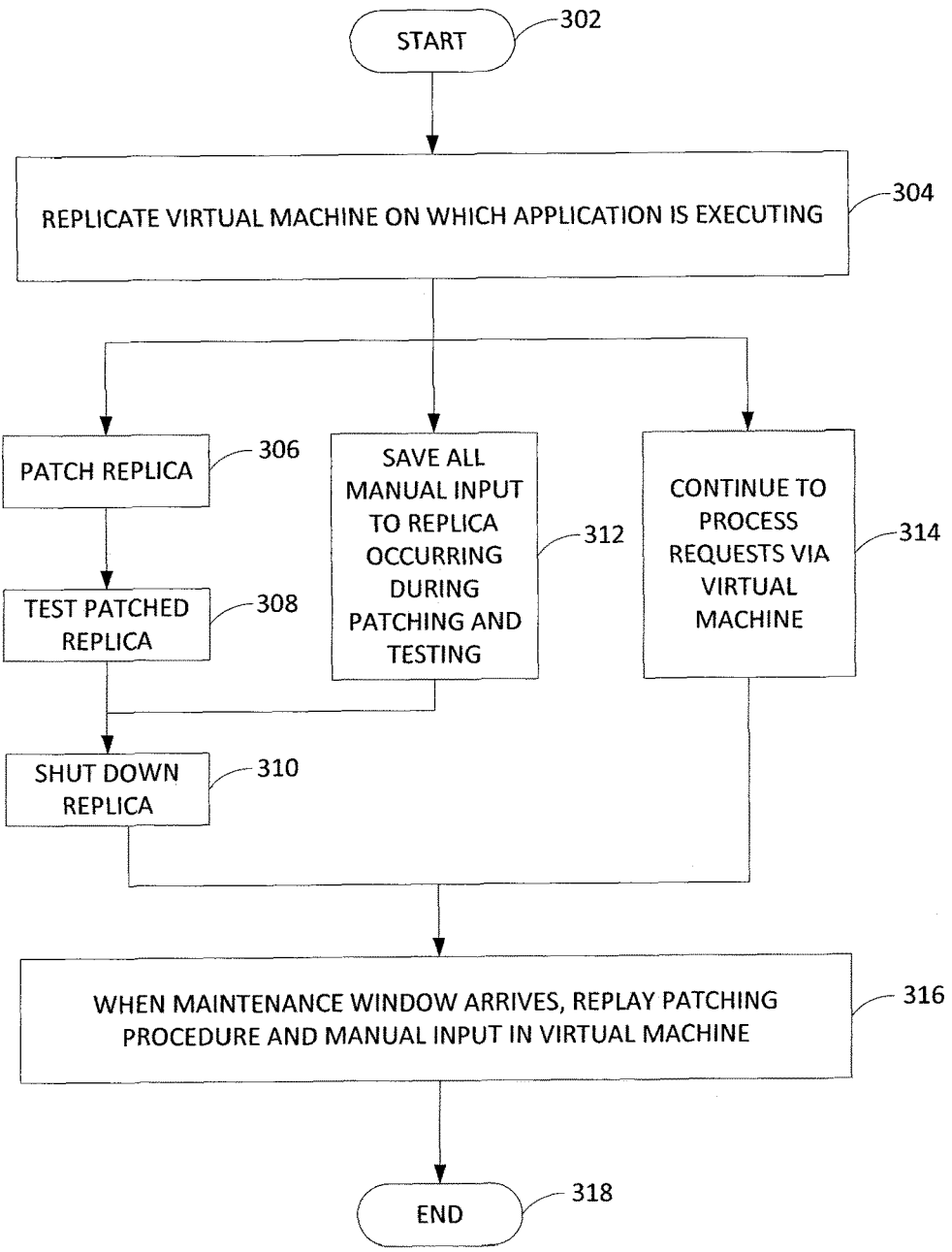
FIG. 3 is a flow diagram illustrating another embodiment of a method for patching an application executing in a virtualized environment, according to embodiments of the present invention.

FIG. 3 is a flow diagram illustrating another embodiment of a method 300 for patching an application executing in a virtualized environment, according to embodiments of the present invention. In particular, the method 300 patches an application using an approach that replays patch procedures. In one embodiment, the method 300 is executed by the AS 104, which in this case manages the replication of the virtual machine and the patching of the replica and virtual machine.

The method 300 begins in step 302. In step 304, the AS 104 replicates the virtual machine on which the application is executing. This results in the creation of a replica virtual machine, or simply a "replica."

Next, three sequences of events occur in parallel (i.e., substantially simultaneously, although one sequence may complete before the other). These three sequences are depicted respectively in steps 306-310, steps 312-314, and step 316 of FIG. 3.

In step 306, the AS 104 patches the replica. Patching of the replica involves applying any updates, security fixes, or the like that are scheduled to be applied to the virtual machine to the replica. In step 308, the patched replica is tested, and any problems identified during testing are fixed (which may also require a reboot of the replica). As illustrated by step 314, the virtual machine continues to process the user requests normally during this time (i.e., while the replica is being patched and tested in steps 306-308).

In step 310, the replica is shut down.

In step 312, the AS 104 saves all manual input (e.g., manual administrator input) in the replica occurring during the patching and testing performed in steps 306-308. Thus, step 312 may be performed substantially simultaneously with steps 306-308 and step 314, as discussed above. The manual input may include, for example, data relating to system configurations and the fixing of problems. Thus, techniques including keystroke logging can be employed to record the inputs. In one embodiment, the input is stored in the DB 106.

In step 316, when a predefined maintenance window arrives (e.g., where the predefined maintenance window specifies when a replay of the patching and manual input may occur), the AS 104 replays the patching procedure performed in step 306 and the manual inputs recorded in step 312 in the virtual machine. By replaying the patching procedure and manual inputs, the virtual machine is brought up to the same state as the replica, which has been updated and tested.

Once the sequences depicted in steps 306-310, 312-314, and 316 have completed, the method 300 ends in step 318.

The method 300 is most helpful when most of the downtime for patching is spent fixing and testing patches and related problems. If the patch procedure itself has a duration that is longer than the predefined maintenance window, then the method 200 is likely to require less overall downtime. Alternatively, an approach that relies on the merging of state deltas may be used, as described below.

Figure 4:
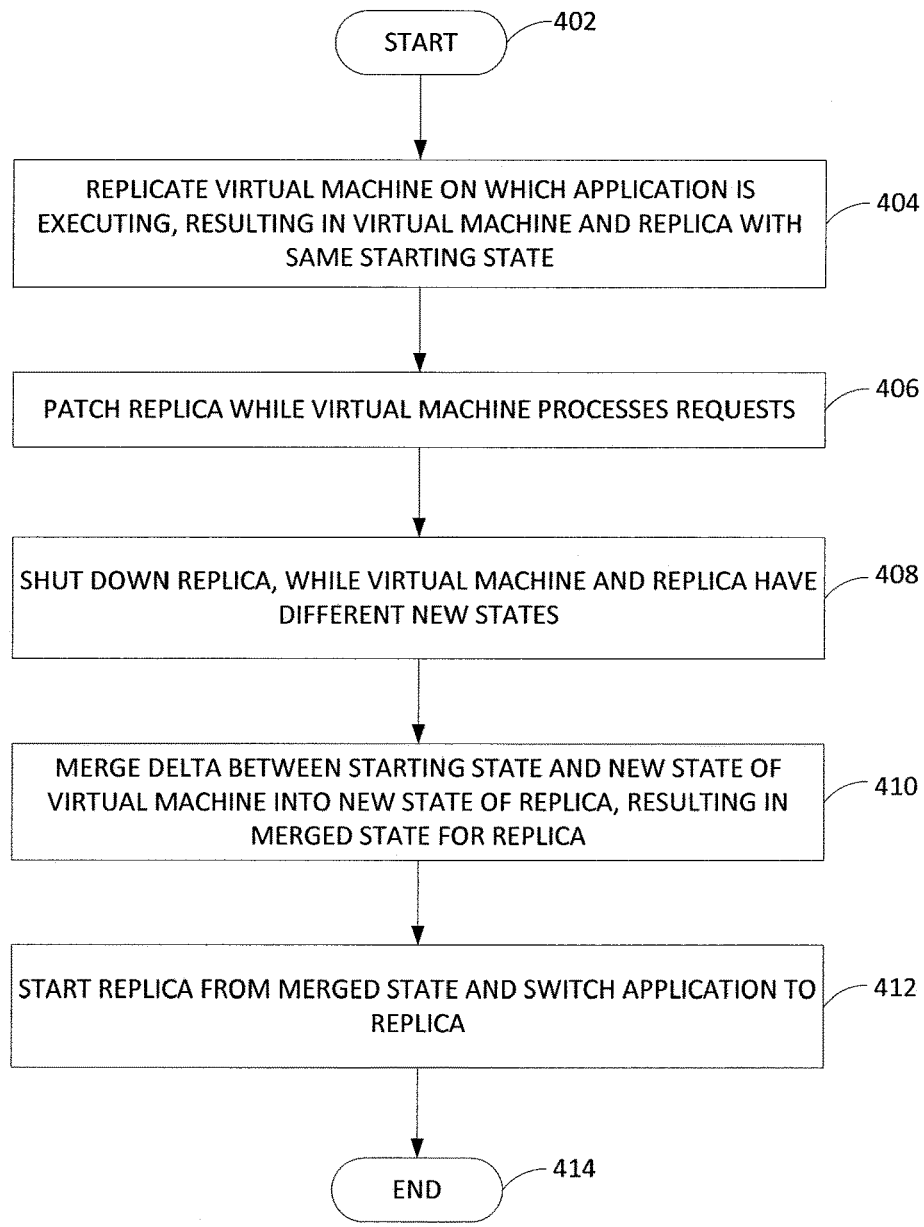
FIG. 4 is a flow diagram illustrating another embodiment of a method for patching an application executing in a virtualized environment, according to embodiments of the present invention.

FIG. 4 is a flow diagram illustrating another embodiment of a method 400 for patching an application executing in a virtualized environment, according to embodiments of the present invention. In particular, the method 400 patches an application using an approach that merges state deltas. In one embodiment, the method 400 is executed by the AS 104, which in this case manages the replication of the virtual machine and the merging of state deltas.

The method 400 begins in step 402. In step 404, the AS 104 replicates the virtual machine on which the application is executing. This results in the creation of a replica virtual machine, or simply a "replica." Immediately after the replication, the virtual machine and the replica have the same "starting" state (hereinafter referred to as "V1").

In step 406, the AS 104 patches the replica. Patching of the replica involves applying any updates, security fixes, or the like that are scheduled to be applied to the virtual machine to the replica. Patching of the replica also includes performing any necessary post-patch testing and fixing any problems identified during testing (which may also require a reboot of the replica). The virtual machine continues to process the user requests normally during this time.

In step 408, the replica is shut down. In one embodiment, the shutdown is performed at the beginning of a predefined maintenance window. At this time, both the virtual machine and the replica will have new states due to the patching process performed in step 406 (i.e., relative to the state V1 and hereinafter referred to as "V3" and "V2," respectively).

In step 410, the AS 104 merges the delta (difference) between the starting state and the new state of the virtual machine (i.e., the delta between states V1 and V3) into the new state of the replica (i.e., the state V2). The resultant state of the replica is a merged state (hereinafter referred to as "V4").

In one embodiment, the merging process referred to in step 410 is performed as follows. For any file f2 in the new state of the replica V2, the corresponding files in the starting state V1, the new state of the virtual machine V3, and the merged state of the replica V4 are hereinafter referred to as f1, f3, and f4 respectively. f1, f2, and f3 may be empty (i.e., deleted) by the time the merged state is reached. If f1 and f2 are equivalent (e.g., the values can be reduced to the same values), and f2 and f3 are not equivalent, then f4 will be equal to B. In this case, f3 will be copied to the replica (or f2 will be deleted from the replica if f3 is empty). If f1 is equivalent to f3, and f2 is not equivalent to f3, then f4 will be equal to f2. In this case, no action needs to be taken. If f1 is equivalent to f2 and is equivalent to f3, or if f2 is equivalent to f3 but f1 is not equivalent to f2, then f4 will be equal to f2. In this case, no action needs to be taken. If f1, f2, and f3 are all different from each other (i.e., there is no equivalence among the files), then a hybrid copy approach may be used. In this case, both f2 and f3 may be copied to the merged state of the replica V4, and f4 is set equal to f3 as a default. The user is then prompted to determine how to perform the merge is any error occurs later. Thus, the manual merge decision is postponed until/if an error occurs; however, the user can also choose to perform a manual merge before an error occurs.

In step 412, the AS 104 starts the replica from the merged state. That is, the application is switched to the replica with a starting state of V4.

In step 414, the method 400 ends.

In one embodiment, the method 400 may be optimized by tracking the input/output (I/O) events in the virtual machine and in the replica to obtain the set of changed files in the new states V2 and V3 relative to the starting state V1.

In another embodiment, timestamps of file modifications may be used to optimize file comparisons. For instance, f1 will be considered equivalent to f2 is f2's modification time is no later than the creation time of the replica. Similarly, f1 will not be considered equivalent to f3 if f3's modification time is later than the creation time of the virtual machine.

Certain scenarios may require much manual effort for merging state deltas in accordance with the method 400. For instance, values that require complicated computation beyond simple copy, insertion, or deletion cannot be merged automatically. As an example, suppose that the starting state V1 includes a table with ten columns and two hundred rows. The patch resulting in the new state of the replica V2 increases the number of columns to twelve and fills both new columns in each row. At the same time, the execution in the new state of the virtual machine V3 adds three hundred rows to the table (i.e., where each new row also has ten columns). The expected merging result in this case would be neither f2 nor f3, but a table having twelve columns and five hundred rows, with any extra columns filled appropriately.

FIG. 5 is a high-level block diagram of the patching method that is implemented using a general purpose computing device 500. In one embodiment, a general purpose computing device 500 comprises a processor 502, a memory 504, a patching module 505 and various input/output (I/O) devices 506 such as a display, a keyboard, a mouse, a stylus, a wireless network access card, an Ethernet interface, and the like. In one embodiment, at least one I/O device is a storage device (e.g., a disk drive, an optical disk drive, a floppy disk drive). It should be understood that the patching module 505 can be implemented as a physical device or subsystem that is coupled to a processor through a communication channel.

Alternatively, the patching module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the patching module 505 for patching systems and applications in a virtualized environment, as described herein with reference to the preceding figures, can be stored on a computer readable storage medium (e.g., RAM, magnetic or optical drive or diskette, and the like).

Referring to FIG. 5, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should also be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for updating an application executing on a virtual machine, wherein the virtual machine is one of a plurality of virtual machines on which the application is executing, the method comprising:
   replicating the virtual machine to produce a replica;
   applying a software update to the replica that is scheduled to be made to the virtual machine, without applying the software update to the virtual machine at the same time, before the software update is applied to the virtual machine;
   in parallel with the applying, updating a state of one of the virtual machine and the replica so that a state of the virtual machine matches a state of the replica, wherein the updating comprises:
      testing the replica after the applying;
      saving user requests received by the virtual machine during the replicating and the applying into a queue, wherein the virtual machine continues to process the user requests during the replicating and the applying;
      creating a mapping between those of the user requests that travel from a virtual machine of the plurality of virtual machines under a control of a first party to a virtual machine of the plurality of virtual machines under a control of a second party and corresponding responses to those of the user requests from the virtual machine of the plurality of virtual machines under the control of the second party to the virtual machine of the plurality of virtual machines under control of the first party;
      replaying data flows between the virtual machine of the plurality of virtual machines under the control of the first party and the virtual machine of the plurality of virtual machines under the control of the second party in the replica, in accordance with the mapping;
      replaying the user requests from the queue to the replica after the applying, until the queue is empty;
      delivering new user requests received after the replaying to the virtual machine and to the replica until a predefined maintenance window arrives;

switching execution of the application from the virtual machine to the replica when the predefined maintenance window arrives; and shutting down the virtual machine after the switching.

2. The method of claim 1, wherein the replicating, the applying, and the updating are performed for each virtual machine of the plurality of virtual machines, resulting in a plurality of replicas.

3. The method of claim 2, wherein the applying and the updating are performed for one replica of the plurality of replicas at a time.

4. The method of claim 2, wherein the applying and the updating are performed for all replicas of the plurality of replicas at once.

5. The method of claim 2, wherein the applying and the updating are performed for all replicas of a subset of the plurality of replicas at once.

6. The method of claim 1, further comprising:

subsequent to the replicating, monitoring system calls in the virtual machine that set seeds for random value generation for session key generation;

recording the seeds; and intercepting the system calls during the replaying, wherein the intercepting comprises providing the seeds.

7. The method of claim 6, further comprising:

matching the seeds to one session of a plurality of sessions handled by the virtual machine, prior to the replaying.

8. A computer program product for updating an application executing on a virtual machine, wherein the virtual machine is one of a plurality of virtual machines on which the application is executing, the computer program product comprising a computer readable storage medium having program instructions embodied therewith, the program instructions executable by a processor to cause the processor to perform a method comprising:

replicating the virtual machine to produce a replica;

applying a software update to the replica that is scheduled to be made to the virtual machine, without applying the software update to the virtual machine at the same time, before the software update is applied to the virtual machine;

in parallel with the applying, updating a state of one of the virtual machine and the replica so that a state of the virtual machine matches a state of the replica, wherein the updating comprises:

testing the replica after the applying;

saving user requests received by the virtual machine during the replicating and the applying into a queue, wherein the virtual machine continues to process the user requests during the replicating and the applying;

creating a mapping between those of the user requests that travel from a virtual machine of the plurality of virtual machines under a control of a first party to a virtual machine of the plurality of virtual machines under a control of a second party and corresponding responses to those of the user requests from the virtual machine of the plurality of virtual machines under the control of the second party to the virtual machine of the plurality of virtual machines under control of the first party;

replaying data flows between the virtual machine of the plurality of virtual machines under the control of the first party and the virtual machine of the plurality of virtual machines under the control of the second party in the replica, in accordance with the mapping;

replaying the user requests from the queue to the replica after the applying, until the queue is empty;

delivering new user requests received after the replaying to the virtual machine and to the replica until a predefined maintenance window arrives;

switching execution of the application from the virtual machine to the replica when the predefined maintenance window arrives; and shutting down the virtual machine after the switching.

* * * * *